(12) United States Patent
Mikami

(10) Patent No.: US 7,585,098 B2
(45) Date of Patent: Sep. 8, 2009

(54) LIGHT SOURCE DEVICE AND LIQUID CRYSTAL DISPLAY DEVICE USING THE SAME

(75) Inventor: Kazuaki Mikami, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 70 days.

(21) Appl. No.: 11/647,238

(22) Filed: Dec. 29, 2006

(65) Prior Publication Data
US 2007/0153539 A1 Jul. 5, 2007

(30) Foreign Application Priority Data

Jan. 4, 2006 (JP) ............................. 2006-000192
Dec. 19, 2006 (JP) ............................. 2006-340613

(51) Int. Cl.
*F21V 7/04* (2006.01)
(52) U.S. Cl. ...................... 362/608; 362/606; 362/612; 362/618; 362/624; 362/97; 362/800; 362/615; 362/622; 362/627; 313/498; 313/500
(58) Field of Classification Search ....................... None
See application file for complete search history.

(56) References Cited

U.S. PATENT DOCUMENTS

| | | | | |
|---|---|---|---|---|
| 6,352,350 | B1* | 3/2002 | Ma | 362/19 |
| 6,608,332 | B2* | 8/2003 | Shimizu et al. | 257/98 |
| 2004/0061810 | A1 | 4/2004 | Lowery et al. | |
| 2006/0215387 | A1* | 9/2006 | Wang et al. | 362/29 |

FOREIGN PATENT DOCUMENTS

| | | |
|---|---|---|
| JP | 2004-118205 | 4/2004 |
| JP | 2004-199967 | 7/2004 |

\* cited by examiner

*Primary Examiner*—Bao Q Truong
*Assistant Examiner*—Danielle Allen
(74) *Attorney, Agent, or Firm*—McGinn IP Law Group, PLLC

(57) ABSTRACT

Color non-uniformity due to LED light sources of a liquid crystal display (LCD) device is improved. A light quantity control film is arranged between an LED source and the entrance surface of a mixing light guide plate. This light quantity control film is arranged in the part which reduces the quantity of light of the LED with the strongest light quantity among a plurality of same colors.

19 Claims, 8 Drawing Sheets

LIGHT SOURCE DEVICE AND LIQUID CRYSTAL DISPLAY DEVICE USING THE SAME

BACKGROUND OF THE INVENTION

1. Field of the Invention

The present invention relates to a light source and a liquid crystal display (LCD) device using, particularly to a light source device using a light emitting diode (LED) and an LCD device using the same.

2. Description of the Related Art

An LCD device which is used for a personal computer or a mobile phone includes an LCD panel and a sheet-like light source device. The LCD panel has a structure in which a liquid crystal layer is interposed between two substrates, and the sheet-like light source device is provided on the rear side of the LCD panel.

As a light source of a sheet-like light source device, a linear cold-cathode tube has been conventionally used. However, because of the long lifespan and excellent light emission property of an LED, the LED has been increasingly used as a light source of a sheet-like light source device.

In the case of using an LED as a light source for backlight of a medium- or large-sized display device, a large number of LEDs are needed for the purpose of obtaining necessary brightness. Moreover, a plurality of LEDs, which emit different lights of wavelengths corresponding respectively to red, green and blue colors, are used for the purpose of obtaining white illumination light.

In the case of using LEDs of these three colors, it is necessary that these colors are mixed and emitted to the side of a display surface without color non-uniformity. For this reason, a mixing light guide plate is needed in addition to an ordinary illuminating light guide plate. Examples of an LCD device using such LEDs as light sources are disclosed in Japanese Patent Application Publication No. 2004-199967 and Japanese Patent Application Publication No. 2004-118205 (corresponding to US Patent Application Publication No. 2004/0061810 A1). FIG. 1 is a cross-sectional view showing a configuration of an LCD device of this type.

As shown in FIG. 1, an LCD device includes an LCD panel 108 and a light source device 120 for illuminating the LCD panel 108. The light source device 120 mainly includes LEDs 101 as light sources, a mixing light guide plate (hereinafter referred to as a mixing plate) 104 and an illuminating light guide plate (hereinafter referred to as an illuminating plate) 105. The mixing plate 104 receives light emitted respectively from the LEDs 101 at one end thereof, mixes colors respectively of the light therein to generate white light, and emits the white light from the other end thereof. The illuminating plate 105 receives the light emitted from the mixing plate 104, and then emits the light from the entire plane thereof to illuminate the LCD panel 108. The LEDs 101 and a reflector 103 are provided to the vicinity of an entrance surface of the mixing plate 104. As the LEDs 101, three kinds of LEDs are used, which emit different lights of wavelengths corresponding respectively to colors of red (R), green (G), and blue (B).

The reflector 103 reflects light generated from the LEDs 101, and introduces the light into the mixing plate 104. A reflector 106 is provided to the side of an emitting surface of the mixing plate 104. The reflector 106 reflects light to an entrance end surface of the illuminating plate 105. The reflector 106 is provided in a manner that the reflector 106 surrounds the emitting surface of the mixing plate 104 and one side surface of the illuminating plate 105. Each of the reflectors 103 and 106 has a mirror-finished inner surface to reflect light efficiently. The LCD panel 108 is provided to a display surface of the illuminating plate 105. Optical sheets 107 are provided between the illuminating plate 105 and the LCD panel 108. The optical sheets 107 is configured of a diffusion sheet, a protection sheet, a prism sheet and the like. The optical sheets 107 diffuses or collects light emitted from the illuminating plate 105 so as to illuminate the LCD panel 108.

A reflective sheet 109 is provided at a rear surface of the illuminating plate 105. The reflective sheet 109 is bent at an end portion of an aluminum frame 110, and is fixed to an upper surface of the mixing plate 104 with a fixture 1.11. The reflective sheet 109 reflects light emitted from the rear surface of the illuminating plate 105, thus causing the reflected light to enter into the illuminating plate 105 again. In this manner, the reflective sheet 109 is used to improve the utilization efficiency of light in the illuminating plate 105.

Next, with reference to FIG. 1, the propagation of light in the LCD device will be described. Light from the LEDs 101 enters into the entrance surface of the mixing plate 104 directly or by being reflected by the reflector 103. The light having entered into the entrance surface of the mixing plate 104 propagates in the mixing plate 104 to be mixed. The light which has become white light after being sufficiently mixed is emitted from the emitting surface of the mixing plate 104, and enters into the reflector 106. The reflector 106 reflects the light emitted from the mixing plate 104 to the illuminating plate 105. The light having entered into the illuminating plate 105 uniformly spreads over an entire surface and is emitted from the emitting surface (illuminating surface) which is a surface on the side on which the optical sheets 107 and the LCD panel 108 are provided. The light emitted from the rear surface of the illuminating plate 105 is reflected by the reflective sheet 109, thus entering into the illuminating plate 105 again.

However, in an LCD device having the LEDs 101 as light sources, as shown FIG. 1, a plurality of LEDs of R, G and B are used. And a color non-uniformity is caused in the illuminating surface of the illuminating plate 105 due to variations in the intensities of light emitted respectively from the LEDs.

As a method of reducing the color non-uniformity, a method can be conceivable in which an LED driver circuit is provided to every LED, or in which an interval between LEDs, arrangement of each color, length of a mixing light guide plate and the like are changed. However, in the cases of employing the above methods of reducing color non-uniformity, it is necessary to change wiring on a substrate on which the LED is mounted, or to change a driver circuit. As a result, there is a problem that the structure of backlight becomes complicated and therefore the costs of manufacturing the backlight increase.

SUMMARY OF THE INVENTION

A light source device of the present invention includes an illuminating light guide plate which emits the light which entered from the end surface from one principal plane, a mixing light guide plate arranged at the back side of the illuminating light guide plate and a plurality of point light sources. The mixing light guide plate has an entrance surface and an emitting surface.

The plurality of point light sources are arranged near the entrance surface of the mixing light guide plate. The plurality of point light sources includes a plurality of point light sources which emit different lights by mutually different colors. And the light source device of the present invention includes a light quantity control film arranged between the point light source and the entrance surface of the mixing light guide plate. A light quantity control film is arranged in a part which reduces the quantity of light from a point light source with the largest quantity of light in the point light sources of the same color.

The light source device of the present invention further includes a reflection film in a vicinity of the entrance surface of the mixing light guide plate. The reflection film reflects the light emitted respectively from the point light sources.

In the light source device of the present invention, the light quantity control film can be provided on the light emitting portion of the point light source, the reflective surface of the reflection film, or the entrance surface of the mixing light guide plate. And a light-shielding film, a light absorption film, or a translucent film can be used for a quantity-of-light regulation membrane. An LED is used as a point light source of the light source device of the present invention.

In the light source device of the present invention, by providing the light quantity control film in a part which reduces the quantity of light of a point light source with the largest quantity of light in the point light sources of the same color to reduce color non-uniformity.

The light source device of the present invention can be used as a light source for an LCD panel, and an LCD device in which the color non-uniformity was reduced can be provided.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1:
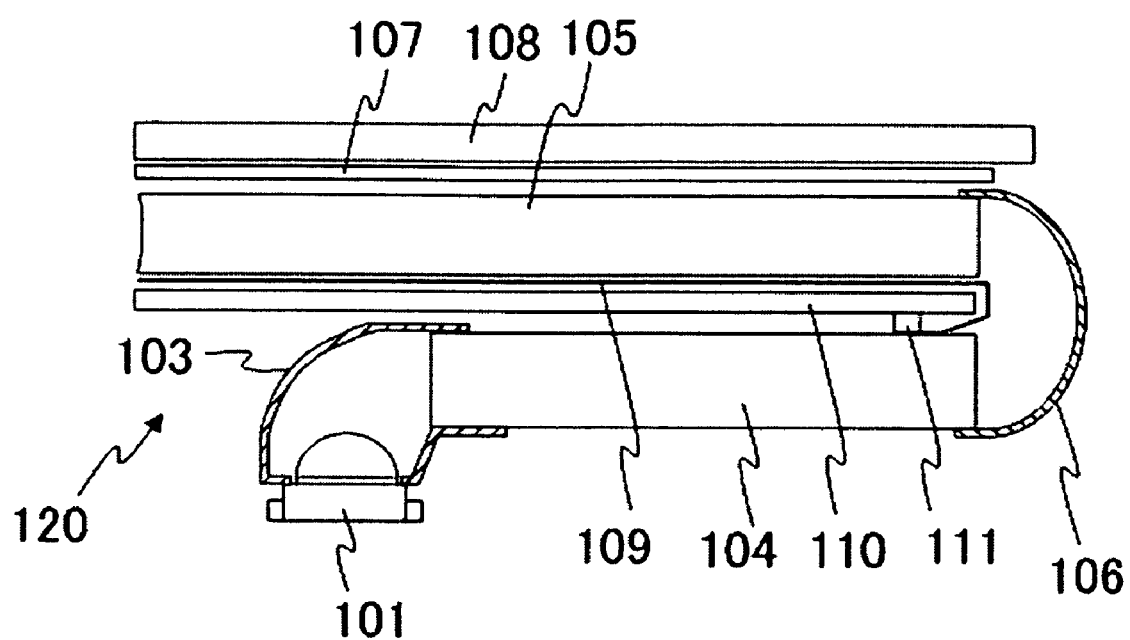
FIG. 1 is a cross-sectional view showing a configuration of a conventional LCD device.
Figure 2:
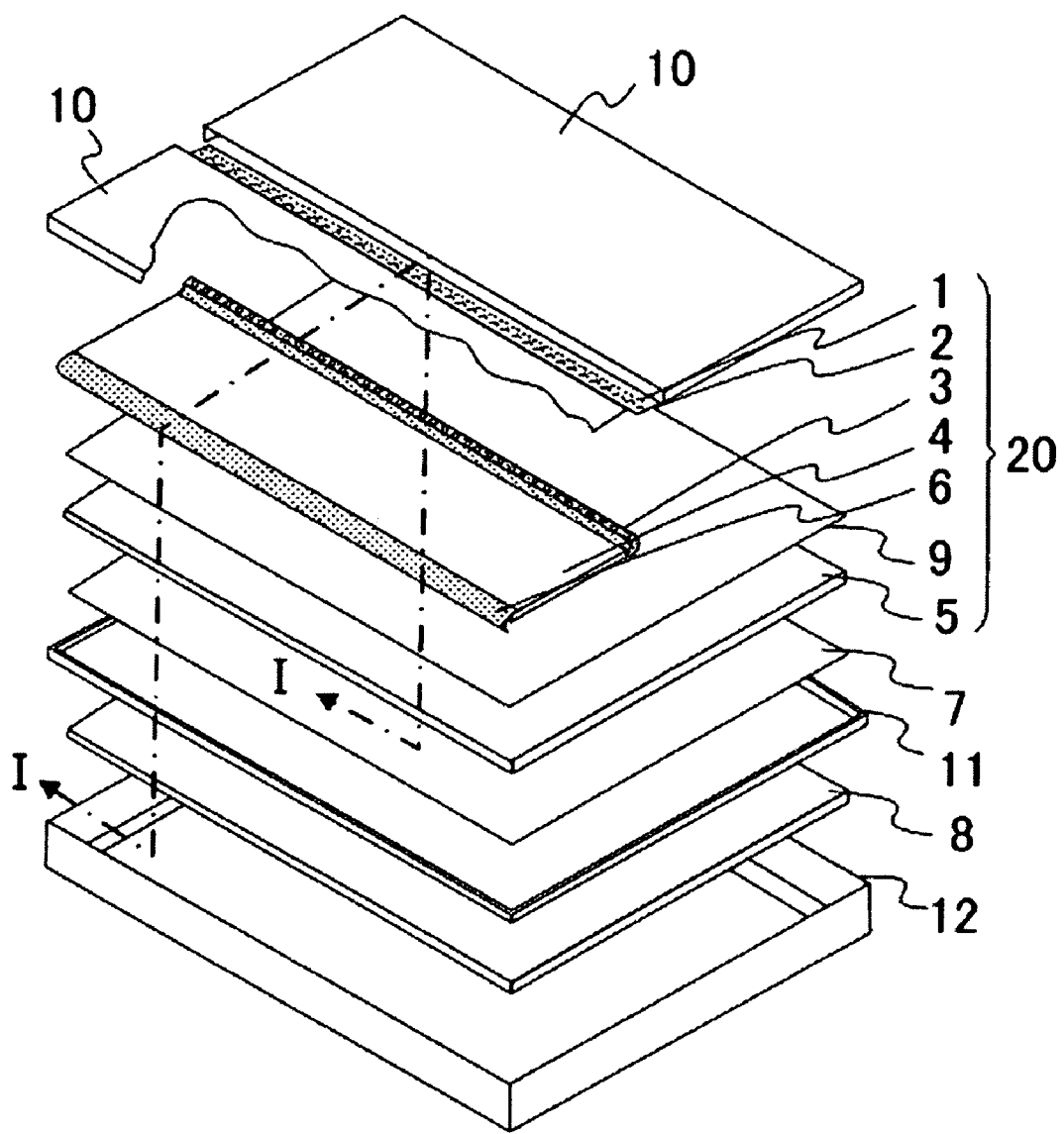
FIG. 2 is an exploded perspective view of an LCD device with a light source device of a first embodiment of the present invention when viewed from the rear side.
Figure 3:
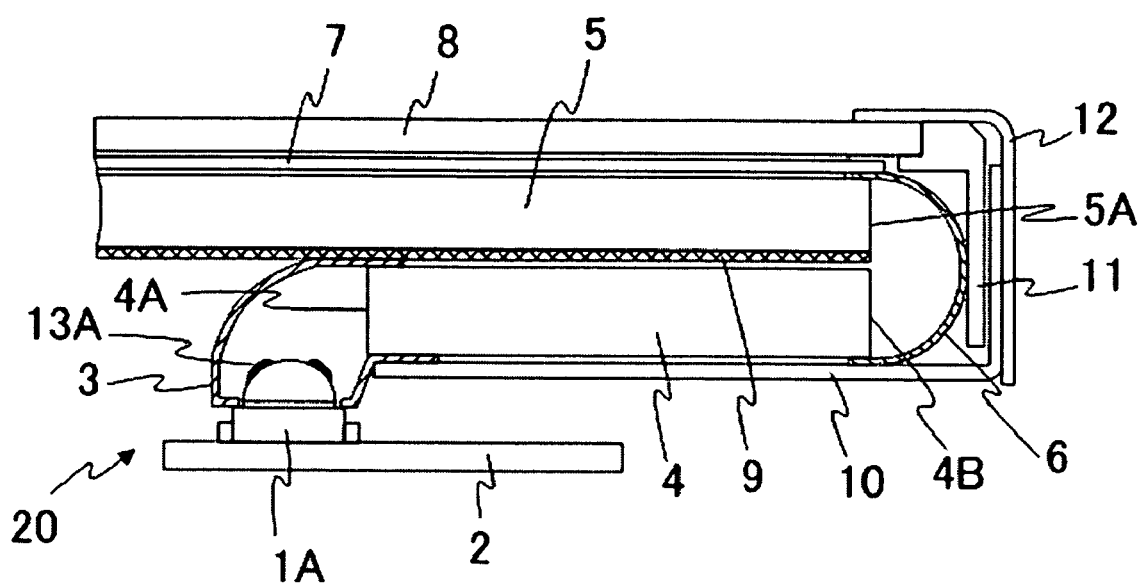
FIG. 3 is a cross-sectional view of a substantial part of the LCD device taken along the I-I line in FIG. 2.
Figure 4:
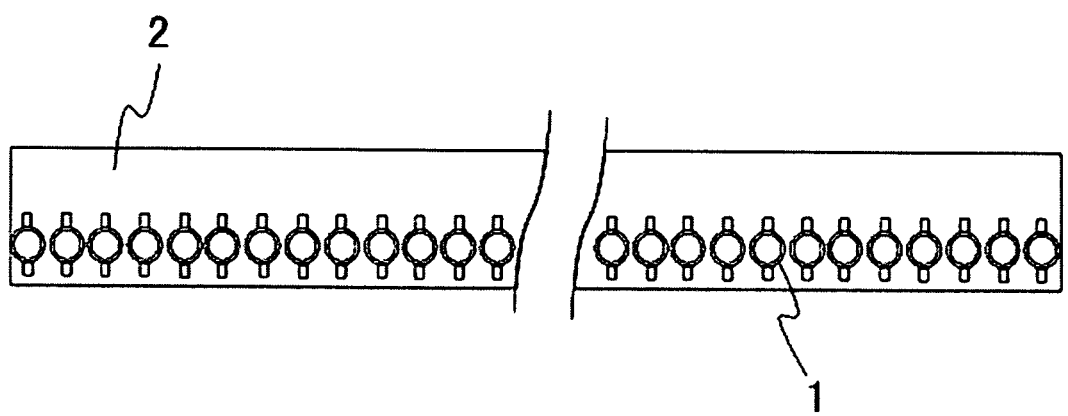
FIG. 4 is a plan view showing a state that LEDs are mounted on a substrate of the light source device of the first embodiment of the present invention.

As shown in FIGS. 2, 3 and 4, an LCD device of the present invention includes an LCD panel 8 and a light source device 20 for illuminating the LCD panel 8. The light source device 20 includes LEDs 1 as light sources and a mixing light guide plate (hereinafter referred to as a mixing plate) 4 which mixes light emitted from the LEDs 1. As shown in FIG. 4, an array of LEDs 1 is mounted on a substrate 2 in a manner that the plurality of LEDs 1 are arranged in a vicinity of a side end surface of the mixing plate 4. Then, a reflector 3 is arranged so as to cover the LEDs 1. The mixing plate 4 is arranged in a manner that the mixing plate 4 is sandwiched by the reflector 3.

The LEDs 1 are configured of a plurality of LEDs, each emitting monochromatic light of red, green or blue color. As the substrate 2, an insulating wiring substrate such as an epoxy resin substrate is used. The arrangement and number of the LEDs 1 are determined so that colors of light emitted from the LEDs become white light as a whole by being mixed by the mixing plate 4. The light source device 20 of the LCD device of the present invention further includes an illuminating light guide plate (hereinafter referred to as illuminating plate) 5 over the mixing plate 4.

In the LCD device of the present invention, in a case where there is an LED in the light source device causing the occurrence of color non-uniformity due to its large quantity of light among the LEDs 1 (for example, shown by LED 1A in FIGS. 3, 6, 7 and 8), the color non-uniformity is reduced by providing a light quantity control film in an optical path of the LED 1A.

In the present embodiment, as shown in FIG. 3, a light-shielding films 13A are provided on the surface of the LED 1A as the light quantity control film. The light-shielding film 13A reduces the quantity of light emitted from the surface of the LED 1A, so that the color non-uniformity of the light emitted from the mixing plate 4 can be suppressed. The light-shielding film 13A may be formed by applying a black or gray coating to the surface of the LED 1A. Such a coating includes, for example, an epoxy resin or the like. An applying area of the light-shielding film 13A is determined so that the quantity of light emitted from the surface of the LED 1A can become a predetermined value.

As other light-shielding means, a cap made of silicon rubber or the like having an aperture on its surface or a cap made of translucent resin may be used. A resin such as a thermoplastic polyester system resin or a thermoplastic polyamide system resin in which a little black pigments were added to adjust transparency is used as a translucent resin. The cap is used in a manner that the LED 1A is covered with the cap. By preparing caps with various aperture ratios or transparencies in advance and by then using one of these caps depending on light-emitting intensity of the LED 1A, it becomes easier to regulate the color non-uniformity.

A reflector 6 is arranged in a vicinity of an emission surface 4B of the mixing plate 4. The reflector 6 covers an entrance portion 5A of the illuminating plate 5 as well. This makes it possible to effectively guide the light emitted from the mixing plate 4 to the illuminating plate 5. On a main surface of the illuminating plate 5, optical sheets 7 are arranged. On the optical sheets 7, an LCD panel 8 is arranged. A reflective sheet 9 is provided on the rear side of the illuminating plate 5 to reflect light toward the LCD panel 8.

As these reflectors 3 and 6, a composite material which is obtained by bonding a metal plate such as aluminum (Al), stainless or brass, with a film having high reflectivity may be used. As the film having high reflectivity, a film obtained by depositing silver (Ag) or Al on transparent resin, or a white resin may be used. It should be noted that the reflecting surface of the reflector 6 is a curved-surface in FIG. 3, but it is not limited to the curved-surface. For example, the reflector 6 may be formed of two planar reflecting surfaces crossing at a predetermined angle.

The mixing plate 4 and the illuminating plate 5 are formed of a transparent material such as acryl resin or glass. As the reflective sheet 9, a reflective sheet which is obtained by depositing a film of metal such as Ag or Al on a plastic sheet made of polyethylene or the like maybe used. The optical sheets 7 is configured of a diffusion sheet, a protection sheet, a prism sheet and the like.

The LCD panel 8 includes a thin film transistor (TFT) array substrate on which a plurality of TFTs are arranged in a matrix form, an opposing substrate and a layer of liquid crystal injected between these two substrates. As the LCD panel 8, a panel equivalent to a conventional LCD panel may be used, and therefore description thereof will be omitted.

Figure 5A:
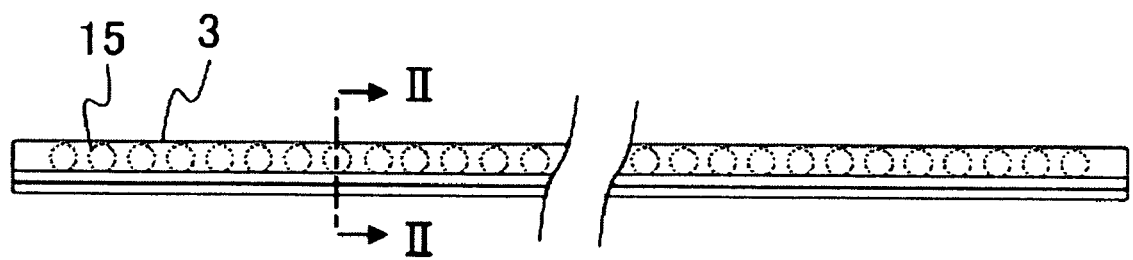
FIG. 5A is a plan view of a reflector in the vicinity of the LEDs in the light source device of the first embodiment of the present invention.
Figure 5B:
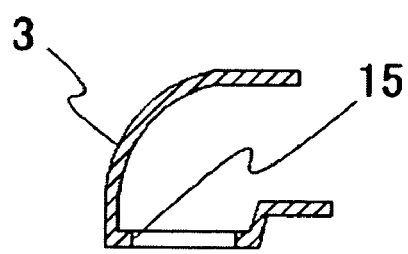
FIG. 5B is a cross-sectional view taken along the II-II line in FIG. 5A.

As shown in FIGS. 5A and 5B, apertures 15 are provided in the reflector 3. The LEDs 1 are covered with the reflector 3 in a manner that the apertures 15 respectively overlap the light-emitting portions of the corresponding LEDs 1. Reference numbers 10, 11 and 12 respectively show a rear cover, a chassis and a front cover, in FIG. 2.

Next, an operation of the LCD device of the present embodiment will be described with reference to FIGS. 2 and 3. Here, description will be given by taking a case where an LED causing color non-uniformity is present among the LEDs 1 of FIG. 2 as an example. In FIG. 3, the LED causing color non-uniformity is shown by an LED 1A. The light emitted from the-LEDs 1 enters into the entrance surface 4A of the mixing plate 4 directly or by being reflected by the reflector 3. The light having entered into the entrance surface 4A of the mixing plate 4 propagates in the mixing plate 4, and is mixed. The light being sufficiently mixed to be white light is emitted from the emitting surface 4B of the mixing plate 4, and enters into the reflector 6. The light reflected by the reflector 6 enters into the entrance surface 5A of the illuminating plate 5. The light having entered into the illuminating plate 5 is reflected by the reflective sheet 9, and uniformly spreads over an entire surface of the illuminating plate 5. The light-shielding film 13A is formed on a light-emitting surface of the LED 1A.

The light-shielding film 13A restricts the quantity of light emitted from the surface of the LED 1A, and regulates the quantity within a preferable value. Accordingly, the generation of color non-uniformity can be suppressed.

The light emitted from the main surface of the illuminating plate 5 for illumination enters into the LCD panel 8 through the optical sheets 7.

Figure 6:
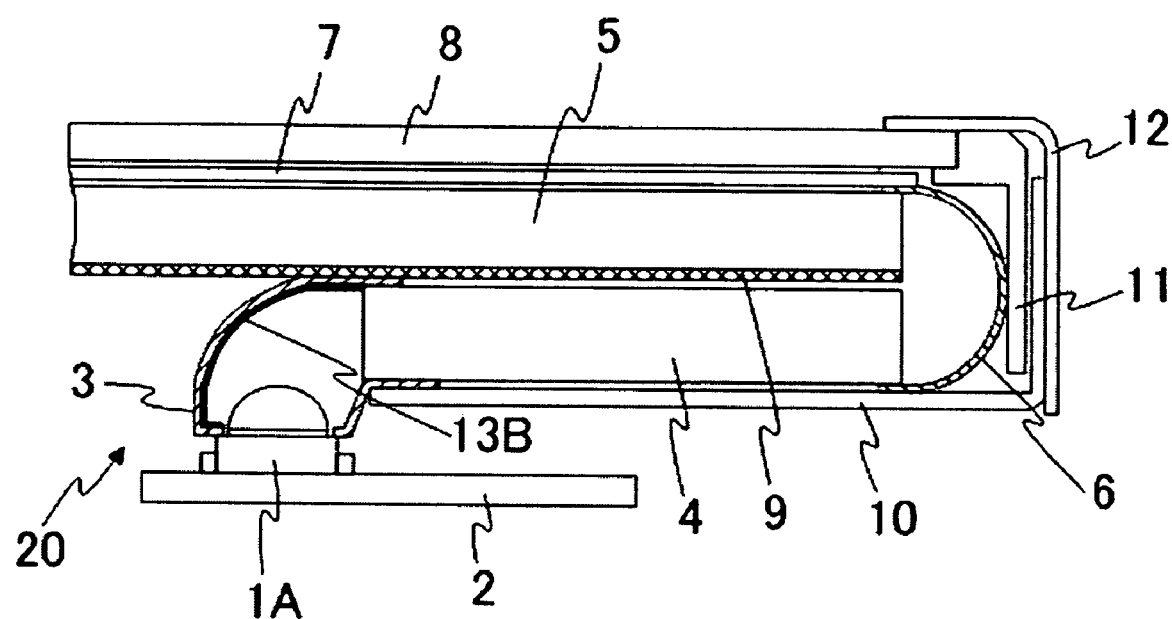
FIG. 6 is a cross-sectional view of a substantial part of an LCD device with a light source device of a second embodiment of the present invention.

Next, an LCD device with a light source device of a second embodiment of the present invention will be described with reference to FIG. 6. In FIG. 6, reference numbers same as those in FIG. 3 denote the same elements as those in FIG. 3. In the above-described first embodiment of the light source device of the present invention, the light-shielding film 13A is provided on the surface of the LED 1A as a light quantity control film.

In the light source device of the present embodiment, a light absorbing film 13B is provided on a predetermined portion of a reflecting surface of the reflector 3 as a light quantity control film. That is, the quantity of light reflected by the reflector 3 after being emitted from the LED 1A is adjusted by reducing the reflectivity of the reflector 3 by using the light absorbing film 13B. In FIG. 6, a black or gray resin film material is used as the light absorbing film 13B.

Light emitted from the LED 1A is reflected by the reflector 3, and then enters into an entrance surface 4A of the mixing plate 4. As a resin film material, a polyethylene terephthalate (PET) resin, a thermoplastic polyester system resin, or a thermoplastic polyamide system resin can be used. The quantity of light reflected by the reflector 3 after emitting from the LED 1A changes, depending on an area of the light absorbing film 13B. As the area of the light absorbing film 13B becomes larger, the quantity of light reflected by the reflector 3 after being emitted from the LED 1A decreases.

The light absorbing film 13B is effective in a case where color non-uniformity is caused because the quantity of light emitted from the LED 1A is too large. In this case, by properly controlling the area of the light absorbing film 13B, the generation of color non-uniformity can be prevented. It should be noted that similar effects can be obtained in the following manner. Instead of the black or gray resin film, a translucent resin film may be bonded as the light absorbing film 13B on the entire reflection surface of the reflector 3 in the optical path of the LED 1A. Resin films, such as PET, can be used as a film.

And light transmittance of the translucent film is adjusted with the addition of a black pigment.

The effect of the light-shielding film formed in reflector 3 using the light source device constituted by arranging 48 LED of No.1-No.48 shown in table-1 to one row was investigated.

Table-2 is a measurement result of the color saturation difference over the central of the center position of each segmented region when dividing the surface of the illuminating plate 5 into five in all directions without forming a light-shielding film in reflector 3. ΔC* is a color saturation difference in the L*a*b* color system which CIE (International Commission on Illumination) defines. X1-X25 of table-2 show the position of the segmented region of a transverse direction, and Y1-Y5 show the position of the segmented region of a lengthwise direction. For example, a central segmented region is denoted with X3Y3. As a value of ΔC*, although five or less are required from a client, in table-2, the color saturation difference ΔC* of the segmented region X1Y5 is over 5 by 5.09. This cause became clear because the red light from the LED of No.2 is too strong. The 2-mm-wide black PET film as a light-shielding film 13B at 30 micrometers in thickness was struck on the reflective surface of the portion of reflector 3 which counters the LED of No.2. Table-3 is a measurement result of ΔC* in each segmented region of illuminating plate 5 when sticking this light-shielding film 13B. In table-3, ΔC* X1Y5 is set to 3.58, and it is shown that the color saturation difference ΔC* was improved by the light-shielding film 13B.

TABLE 1

Arrangement of LEDs

| LED No. | LED Color |
|---|---|
| 1 | G |
| 2 | R |
| 3 | B |
| 4 | G |
| 5 | R |
| 6 | G |
| 7 | R |
| 8 | B |
| 9 | G |
| 10 | R |
| 11 | G |
| 12 | R |
| 13 | B |
| 14 | G |
| 15 | R |
| 16 | G |
| 17 | B |
| 18 | R |
| 19 | G |
| 20 | R |
| 21 | G |
| 22 | B |
| 23 | R |
| 24 | G |
| 25 | G |

TABLE 1-continued

Arrangement of LEDs

| LED No. | LED Color |
|---|---|
| 26 | R |
| 27 | B |
| 28 | G |
| 29 | R |
| 30 | G |
| 31 | R |
| 32 | B |
| 33 | G |
| 34 | R |
| 35 | G |
| 36 | B |
| 37 | R |
| 38 | G |
| 39 | R |
| 40 | G |
| 41 | B |
| 42 | R |
| 43 | G |
| 44 | R |
| 45 | G |
| 46 | B |
| 47 | R |
| 48 | G |

G: Green LED
R: Red LED
B: Blue LED

Thus, the quantity of light which enters into color mixing plate 4 can be reduced by providing a light-shielding film in the reflective surface of the reflector which counters LED with the largest quantity of light (for example, No.2 LED) in LED of the same color (for example, red color). As a result, the color saturation difference in the surface of illuminating plate 5 can be made small.

TABLE 2

The color saturation difference (ΔC*) of the illumination side over the center of an illumination side (with no light-shielding film on the surface of a reflector)

|  | X1 | X2 | X3 | X4 | X5 |
|---|---|---|---|---|---|
| Y1 | 3.63 | 1.15 | 0.59 | 1.26 | 1.33 |
| Y2 | 2.2 | 0.58 | 0.63 | 0.24 | 0.37 |
| Y3 | 2.11 | 1.27 | 0.00 | 1.13 | 1.11 |
| Y4 | 3.07 | 2.25 | 1.60 | 2.34 | 2.34 |
| Y5 | 5.09 | 3.07 | 0.39 | 2.49 | 2.51 |

TABLE 3

The color saturation difference (ΔC*) of the illumination side over the center of an illumination side (with a light-shielding film on the surface of a reflector portion near No. 2 LED)

|  | X1 | X2 | X3 | X4 | X5 |
|---|---|---|---|---|---|
| Y1 | 2.91 | 1.18 | 0.51 | 0.58 | 1.09 |
| Y2 | 1.67 | 0.68 | 0.65 | 0.17 | 0.49 |
| Y3 | 1.21 | 1.23 | 0.00 | 1.35 | 1.13 |
| Y4 | 1.95 | 2.18 | 1.85 | 2.37 | 2.43 |
| Y5 | 3.58 | 3.50 | 0.17 | 2.66 | 2.36 |

Figure 7:
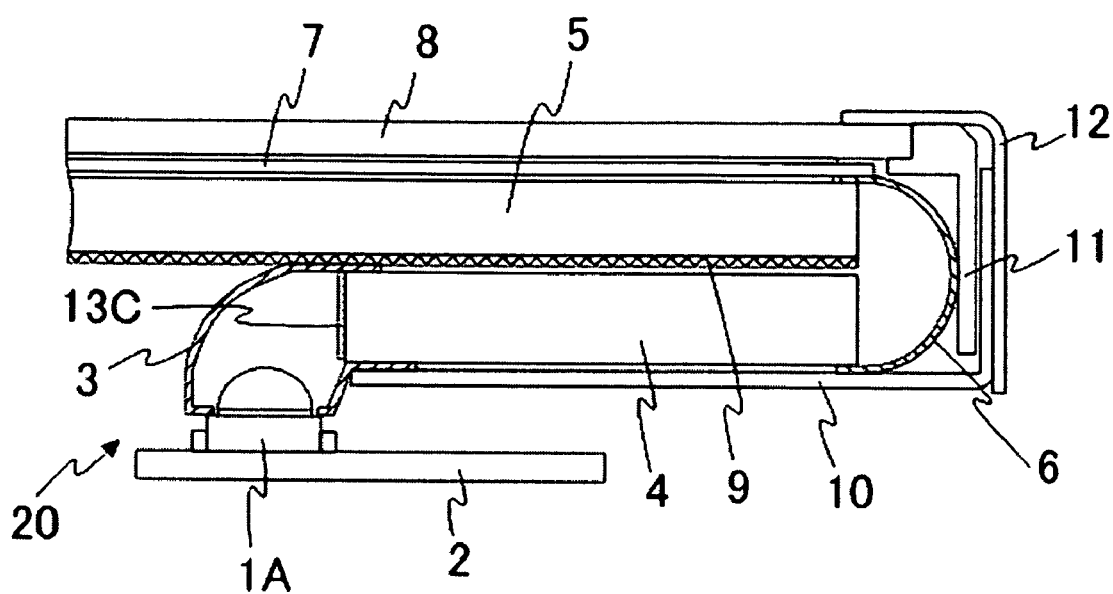
FIG. 7 is a cross-sectional view of a substantial part of an LCD device with a light source device of a third embodiment of the present invention.

Next, an LCD device according to a third embodiment of the present invention will be described with reference to FIG. 7. In FIG. 7, reference numbers same as those in FIG. 3 denote the same elements as those in FIG. 3. In the present embodiment, instead of the light-shielding film 13A provided onto the LED 1A as described in the first embodiment of the present invention, a translucent light quantity control film 13C formed of a translucent resin film is bonded with the entrance surface 4A of the mixing plate 4 in the optical path of light emitted from the LED 1A. As the translucent film, a film formed by dispersing a light diffusion material such as aluminum oxide or titanium oxide into a synthetic resin having optical transparency, such as acryl resin, aesthete, polycarbonate, polyester or polyurethane may be used.

Light emitted from the LED 1A is reflected by the reflector 3, and enters into the entrance surface 4A of the mixing plate 4. Since the translucent light quantity control film 13C is bonded on the entrance surface 4A, a quantity of the light introduced into the mixing plate 4 after being emitted from the LED 1A is reduced. As the translucent light quantity film 13C becomes thicker, the quantity of light introduced into the mixing plate 4 decreases. The translucent light quantity control film 13C is effective in a case where color non-uniformity is caused by too large quantity of light emitted from the LED 1A. In this case, by using the translucent light quantity control film 13C of a translucent film formed by properly control its thickness and the amount of a light diffusion material added thereto, the generation of color non-uniformity can be prevented.

Figure 8:
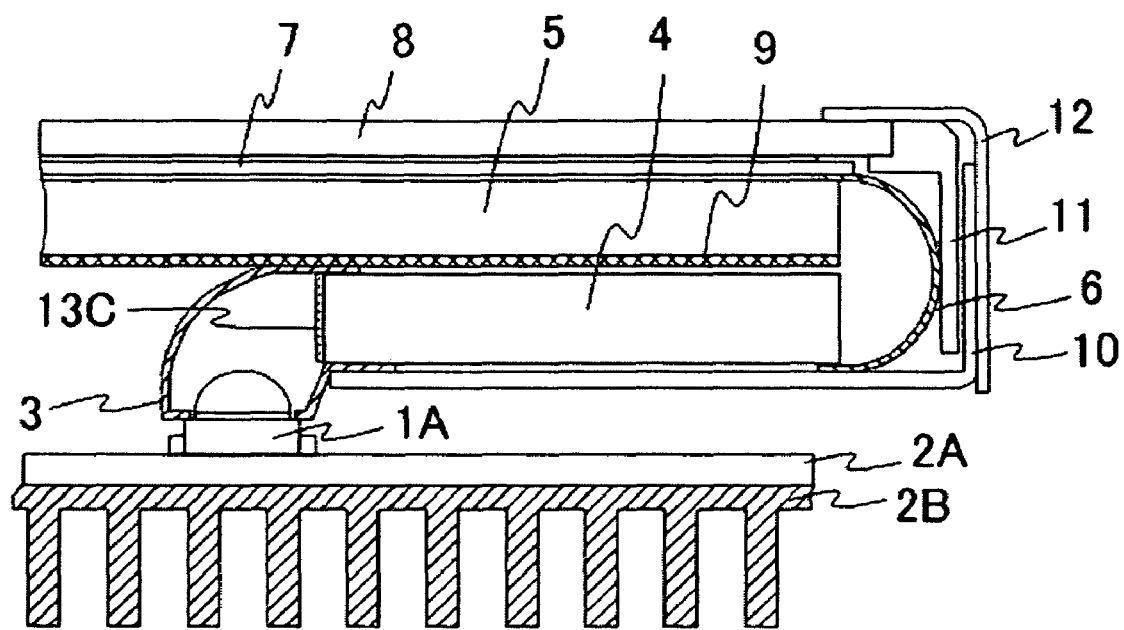
FIG. 8 is a cross-sectional view of a substantial part of an LCD device with a light source device of a fourth embodiment of the present invention.

Next, an LCD device according to a fourth embodiment of the present invention will be described with reference to FIG. 8. In FIG. 8, reference numbers same as those in FIG. 7 denote the same elements as those in FIG. 7. In the present embodiment, a radiator plate 2A is used instead of the substrate 2 on which the LED 1 is mounted as described in the third embodiment of the present invention, and a radiator fin 2B is further provided in contact with the radiator plate 2A. In the present embodiment, by using the radiator plate 2A and the radiator fin 2B, effects similar to those of the third embodiment can be obtained, and increase in temperature of the LED 1 can also be suppressed. Incidentally, it is needless to mention that the radiator plate 2A and the radiator fin 2B are applicable also to the above-described LCD devices of the first and second embodiments.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents are can be included within the spirit and scope of the following claims.

What is claimed is:

1. A light source device comprising:
   an illuminating light guide plate guiding a light entered from an end surface thereof and emitting the light from a main surface thereof;
   a mixing light guide plate arranged at a back side of the illuminating light guide plate, the mixing light guide plate having an entrance surface and an emitting surface;
   a plurality of point light sources arranged near the entrance surface of the mixing light guide plate, the plurality of paint light sources comprising:
   a first portion of said plurality of point light sources, said first portion emitting light by a mutually different color; and
   a second portion of said plurality of point light sources, said second portion emitting light of a same color; and
   a light quantity control film arranged on one of the plurality of point light sources, the light quantity control film shielding a quantity of light provided by said one of the plurality of point light sources such that a light quantity of a point light source having a light quantity that is strongest of the second portion is reduced.

2. The light source device according to claim 1, wherein the light quantity control film comprises one of a black resin film and a gray resin.

3. The light source device according to claim 1, wherein the light quantity control film is arranged such that said light quantity comprises a predetermined emitted light value.

4. The light source device according to claim 3, wherein the light quantity control film comprises a translucent film.

5. The light source device according to claim 1, wherein the one of the plurality of point light sources comprises a light emitting diode.

6. The light source device according to claim 1, wherein the plurality of point light sources comprises a plurality of light emitting diodes emitting a plurality of monochromatic beams of light, said beams comprising a color of one of at least red, green, and blue.

7. A liquid crystal display device comprising:
a liquid crystal display panel; and
a light source device according to claim 1 illuminating the liquid crystal display panel.

8. The light source device according to claim 1, wherein said light quantity control film is arranged such that said light quantity comprises a predetermined emitted light value.

9. A light source device,
an illuminating light guide plate guiding a light entered from an end surface thereof and emitting the light from a main surface thereof;
a mixing light guide plate arranged at a back side of the illuminating light guide plate, the mixing light guide plate having an entrance surface and an emitting surface;
a plurality of point light sources arranged near the entrance surface of the mixing light guide plate, the plurality of point light sources comprising:
a first portion of said plurality of point light sources, said first portion emitting light by a mutually different color; and
a second portion of said plurality of point light sources, said second portion emitting light of a same color;
a reflection film in a vicinity of the entrance surface of the mixing light guide plate, the reflection film reflecting light emitted from the plurality of point light sources; and
a light quantity control film provided on a surface of said reflection film, said light quantity control film absorbing a quantity of light emitted from said plurality of point light sources such that a light quantity of a point light source having a light quantity that is strongest of the second portion is reduced.

10. The light source device according to claim 9, wherein the plurality of point light sources comprises a plurality of light emitting diodes emitting a plurality of monochromatic beams of light, said beams comprising a color of one of at least red, green, and blue.

11. The light source device according to claim 9, wherein the light quantity control film comprises one of a black resin film and a gray resin film.

12. The light source device according to claim 9, wherein the light quantity control film is arranged such that said light quantity comprises a predetermined emitted light value.

13. A liquid crystal display device comprising:
a liquid crystal display panel; and
a light source device according to claim 9, illuminating the liquid crystal display panel.

14. The liquid crystal display device according to claim 13, wherein light emitted from the plurality of point light sources one of directly enters the entrance surface of the mixing light guide plate and enters the entrance surface by being reflected by the reflector film,
wherein light entering the entrance surface of the mixing light guide plate propagates and mixes in the mixing light guide plate,
wherein light is emitted from the mixing light guide plate and is reflected into the illuminating light guide plate, said light uniformly spreading over the illuminating light guide plate, and
wherein light emitted from the illuminating light guide plate enters into the liquid crystal display panel through a plurality of optical sheets.

15. The light source device according to claim 9, wherein said reflection film comprises one of a white resin and one of Ag and Al formed on transparent resin.

16. A light source device, comprising:
an illuminating light guide plate guiding a light entered from an end surface thereof and emitting the light from a main surface thereof;
a mixing light guide plate arranged at a back side of the illuminating light guide plate, the mixing light guide plate having an entrance surface and an emitting surface;
a plurality of point light sources arranged near the entrance surface of the mixing light guide plate, the plurality of point light sources comprising:
a first portion of said plurality of point light sources, said first portion emitting light by a mutually different color; and
a second portion of said plurality of point light sources, said second portion emitting light of a same color; and
a light quality control film provided on the entrance surface of the mixing light guide plate in an optical path of a quantity of light emitted from the plurality of point light sources, said light quantity control film being translucent with respect to said quantity of light emitted from said plurality of point light sources such that a light quantity of a point light source having a light quantity that is strongest of the second portion is reduced.

17. The light source device according to claim 16, wherein the plurality of point light sources comprises a plurality of light emitting diodes emitting a plurality of monochromatic beams of light, said beams comprising a color of one of at least red, green, and blue.

18. A liquid crystal display device comprising:
a liquid crystal display panel; and
a light source device according to claim 16, illuminating the liquid crystal display panel.

19. The light source device according to claim 16, wherein said light quantity control film is arranged such that said light quantity comprises a predetermined emitted light value.

* * * * *